United States Patent [19]

Lenson

[11] Patent Number: 4,978,247
[45] Date of Patent: Dec. 18, 1990

[54] EROSION CONTROL DEVICE

[76] Inventor: Walter J. Lenson, 140 Millbank Drive, London, Ontario, N6C 4V7, Canada

[21] Appl. No.: 20,029

[22] Filed: Feb. 27, 1987

Related U.S. Application Data

[63] Continuation-in-part of Ser. No. 859,720, May 5, 1986, abandoned.

[51] Int. Cl.$^5$ .............................................. E02B 3/04
[52] U.S. Cl. ......................................... 405/15; 405/21; 405/29; 405/30; 52/608
[58] Field of Search ................................... 405/15–17, 405/21, 23, 25, 29–35, 61; 52/596, 608, 609; D25/80, 87–90, 93

[56] References Cited

U.S. PATENT DOCUMENTS

| | | |
|---|---|---|
| 905,596 | 12/1908 | Smith . |
| 954,283 | 4/1910 | Hawkes .................................. 405/21 |
| 1,230,608 | 6/1917 | Sheldon ................................. 405/32 |
| 1,277,829 | 9/1918 | Baum . |
| 2,191,924 | 2/1940 | Humphrey . |
| 2,474,786 | 6/1949 | Humphrey . |
| 2,653,450 | 9/1953 | Fort . |
| 2,755,631 | 7/1956 | Hayden . |
| 3,011,316 | 12/1961 | Wilson . |
| 3,118,282 | 1/1964 | Jarlan . |
| 3,176,468 | 4/1965 | Nagai et al. . |
| 3,252,287 | 5/1966 | Suzuki . |
| 3,280,569 | 10/1966 | Wosenitz . |
| 3,282,054 | 11/1966 | Saginor . |
| 3,357,192 | 12/1967 | Hibarger . |
| 3,386,250 | 6/1968 | Katayama . |
| 3,386,252 | 6/1968 | Nelson . |
| 3,479,824 | 11/1969 | Schaaf et al. . |
| 3,597,928 | 8/1971 | Pilaar . |
| 3,844,125 | 10/1974 | Williams, Sr. . |
| 3,875,750 | 4/1975 | Campbell .............................. 405/33 |
| 3,894,397 | 7/1975 | Fair . |
| 3,913,333 | 10/1975 | Hubbard, Jr. . |
| 4,129,006 | 12/1978 | Payne ..................................... 405/31 |
| 4,269,537 | 5/1981 | O'Neill .............................. 405/33 X |
| 4,367,978 | 1/1983 | Schaaf et al. .......................... 405/30 |
| 4,407,608 | 10/1983 | Hubbard ............................ 405/25 X |
| 4,479,740 | 10/1984 | Schaaf et al. .......................... 405/30 |
| 4,498,805 | 2/1985 | Weir ....................................... 405/31 |
| 4,502,816 | 3/1985 | Creter .................................... 405/30 |
| 4,711,598 | 12/1987 | Schaaf et al. .......................... 405/30 |

FOREIGN PATENT DOCUMENTS

| | | |
|---|---|---|
| 953520 | 8/1974 | Canada . |
| 1111264 | 10/1981 | Canada . |
| 730189 | 8/1932 | France . |
| 52008 | 3/1984 | Japan ..................................... 405/16 |
| 769861 | 3/1957 | United Kingdom . |

OTHER PUBLICATIONS

Information Leaflet on Great Lakes Environmental Marine Ltd. of Chicago, Ill.
Low Cost Shore Protection–Final Report on the Erosion Control Demonstration Program; U.S. Army Corps of Engineers.

Primary Examiner—Randolph A. Reese
Assistant Examiner—John Ricci
Attorney, Agent, or Firm—Ostrolenk, Faber, Gerb & Soffen

[57] ABSTRACT

A modular breakwater device for placement on the floor in a body of water to alleviate erosion effects. There is a seaward face surface and a landward face surface. A plurality of passages extend between those surfaces permitting water to pass through them. The body has a continuous, uninterrupted lower surface. A number of legs extend from the lower surface and raise it off the floor and define a second passage beneath the lower surface and enables stable footing of the device on the beach floor. Details of the legs, the undersurface and the shaping of the seaward and landward surfaces appear.

11 Claims, 5 Drawing Sheets

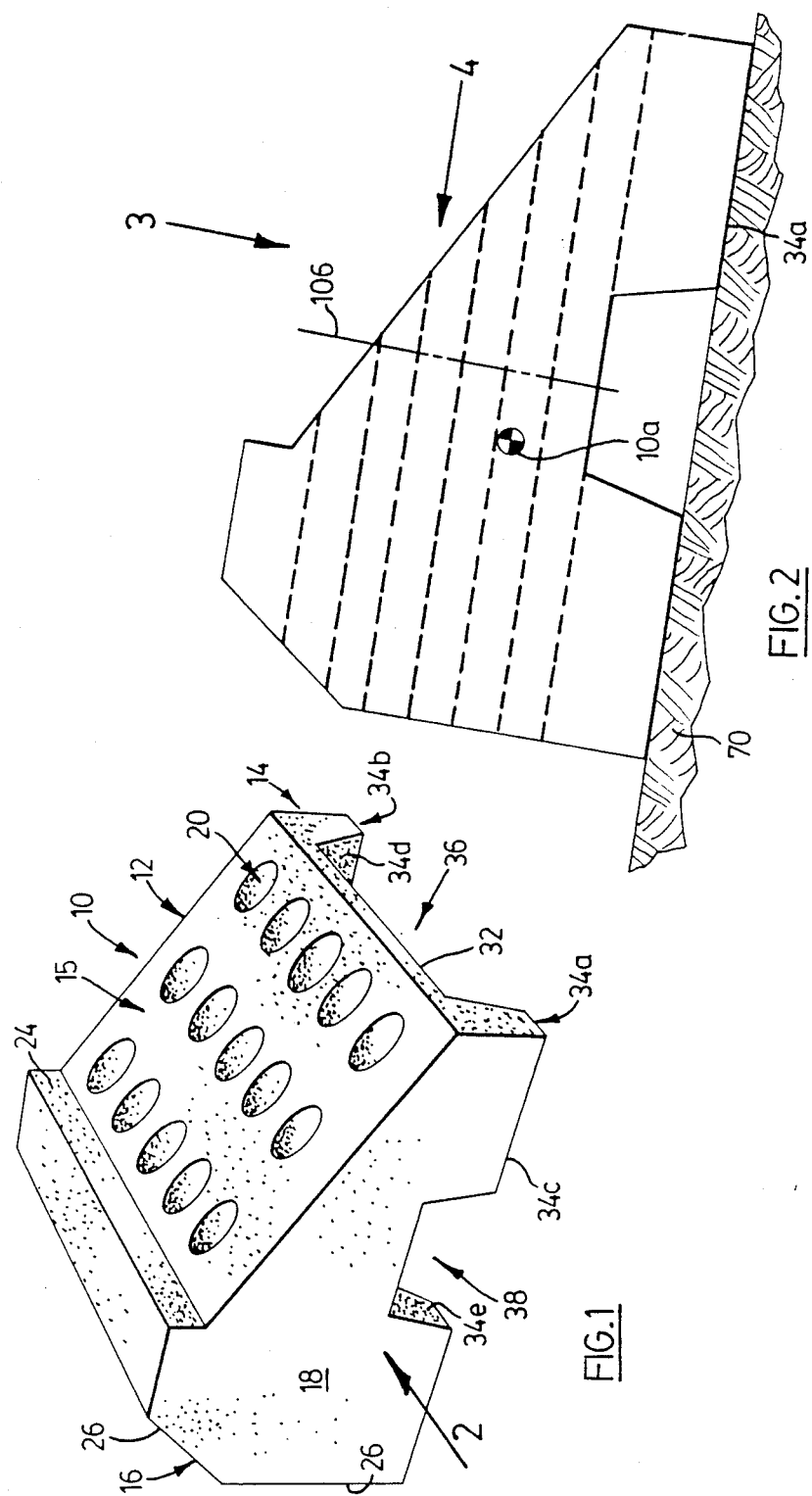

EROSION CONTROL DEVICE

This application is a continuation-in-part of application Ser. No. 06/859,720 filed May 5, 1986, abandoned.

The present invention relates to breakwaters.

Soil erosion has been a long-standing problem along shorelines and is mainly due to the destructive nature of incoming waves. Several techniques have been used to protect shorelines from erosion. One technique involves the use of a revetment wall which is placed on top of the shoreline to shield the shoreline against the incoming waves, while providing protection to the shoreline. The revetment wall has the inherent disadvantage of inhibiting the deposition of sediment on the shore surface, an important process in maintaining the shoreline. In some cases, the revetment wall is porous so as to allow water inflow and outflow between the revetment wall and the shore surface. This adds further complications since expensive and time-consuming measures must be taken to avoid erosion on the shore surface, for example, by placing a protective mat or the like thereon before the placement of the revetment wall.

In another technique, breakwaters are located offshore to dissipate incoming waves, while at the same time allowing for sediment to be deposited on the shore.

One type of such breakwaters is formed from a plurality of portable units which are placed side by side on the beach floor. However, such conventional breakwaters interrupt the subcurrents travelling along the beach floor which causes a high rate of subsurface erosion or "scouring" along the base of the breakwater. At best, satisfactory operation of such breakwater devices requires frequent maintenance to restore a stable footing therebeneath.

It is accordingly an object of the present invention to provide a novel form of breakwater.

According to the present invention, there is provided a modular breakwater device for placement near the shore of a body of water for the alleviation of the effects of erosion, comprising a body portion having a first surface defining a seaward face and oppositely disposed therefrom a second surface defining a landward face, a base portion having a lower surface which is spaced from the beach floor so as to allow water to flow beneath said base, thereby minimizing the effects of scour along said base portion.

In another aspect of the present invention there is provided a method of forming a breakwater along the shore of a body of water, comprising the steps of:

disposing a breakwater device on the beach floor, the breakwater device having a body portion with a first inclined surface defining a seaward face and oppositely disposed from a second surface defining a landward face, with passages extending between said first and second surfaces, said breakwater device having a lower surface; and spacing said lower surface from said beach floor so as to allow water subcurrents to flow beneath said device.

Further features, objects and advantages of the invention will become evident following a detailed description of a preferred embodiment, given by way of example only, as illustrated in the appended drawings in which:

FIG. 1 is a perspective view of a breakwater device.

FIG. 2 is a side elevational view taken on arrow 2 of FIG. 1.

Figure 3:
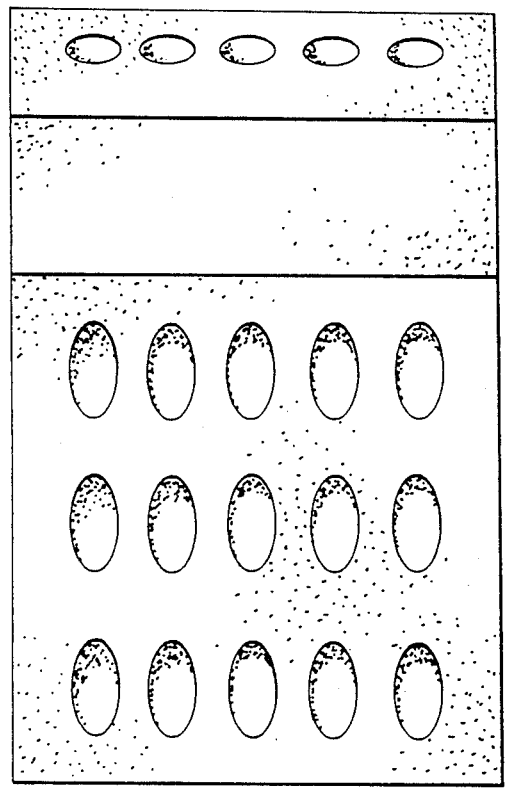
FIG. 3 is a plan view taken on arrow 3 of FIG. 2.
Figure 4:
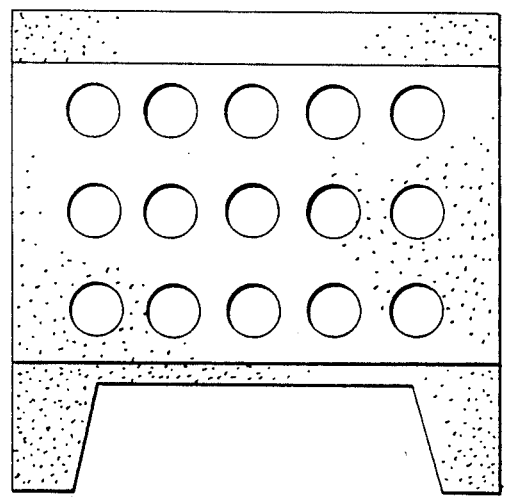
FIG. 4 is a rear elevational view taken on arrow 4 of FIG. 2.
Figure 5:
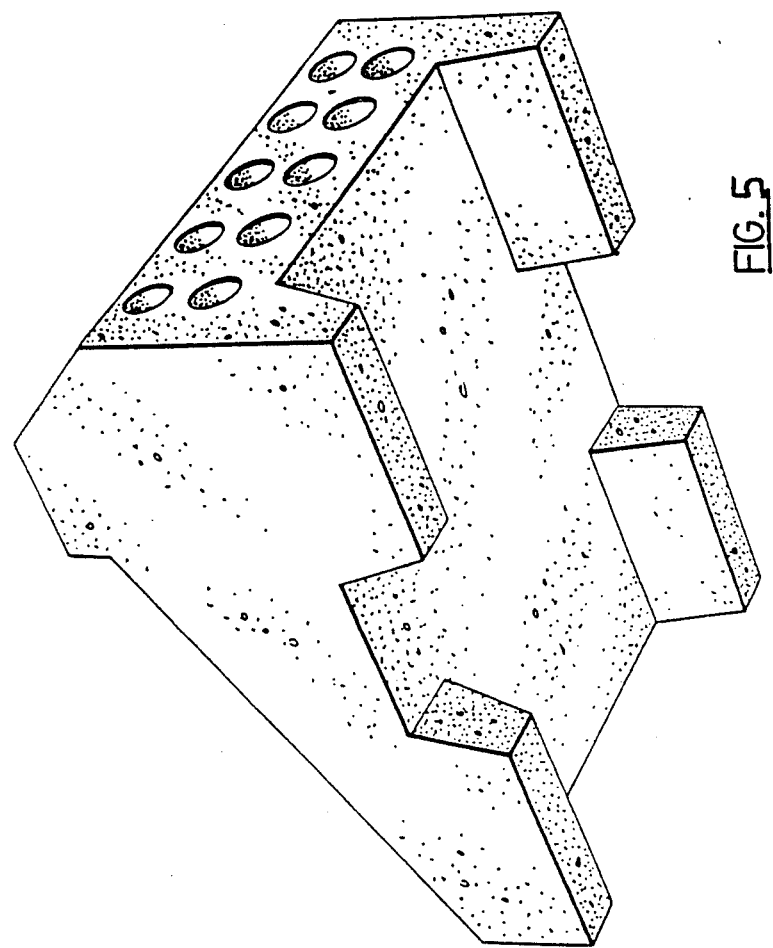
FIG. 5 is an upward rear perspective view of the device illustrated in FIG. 1.

Referring now to the drawings, a breakwater device is shown at 10 which is formed from a concrete material and having a body portion 12 of a generally triangular prism shape and a base portion 14. The body portion 12 has a first face 15 and a second face 16 which extend across the width of respective sides of the body 12. Also provided are a number of circular passages 20 extending between the first and second faces.

Forming the first face is a first inclined surface 22 and a generally vertical upper surface 24 at the upper end thereof. The first inclined surface 22 is downwardly divergent relative to the second face which has a generally vertical lower surface 26, and a second inclined surface 28 at the upper end thereof.

A particular feature of the device 10 is the base 14 having a lower surface 32. Located at the left hand and right corners of lower surface 32 as viewed in FIG. 1 are legs 34a and 34b respectively each having a bottom surface 34c and an inclined surface 34d which cooperates with the adjacent surface on the neighboring leg to form a passage 36. In a similar manner an inclined surface 34l is provided on an inner end of each leg 34 so as to define a passage 38. These features provide a stable footing for the device, while maintaining the lower surface at a distance from the beach floor, as will be described, to define first and second current passages 36, 38 respectively.

In order to enhance the structural integrity of the device 10, the body portion 12 is provided with central and laterally outwardly spaced reinforcement members 40, 42, respectively, each having respective cross members 40a, 42a and end supports 40b, 42b depending from the ends thereof. The use of such reinforcement members has several significant advantages, one being that they provide protection against the high forces which are typically exerted on the first surface 15 by the impact of large sections of ice during the winter months In addition, the reinforcement members provide the tensional strength to withstand the expansion forces exerted by the formation of ice in the passages. Moreover, the circular shape of passages provide an even distribution of forces around the periphery thereof, so as to mitigate damage due to stress concentration.

Figure 6:
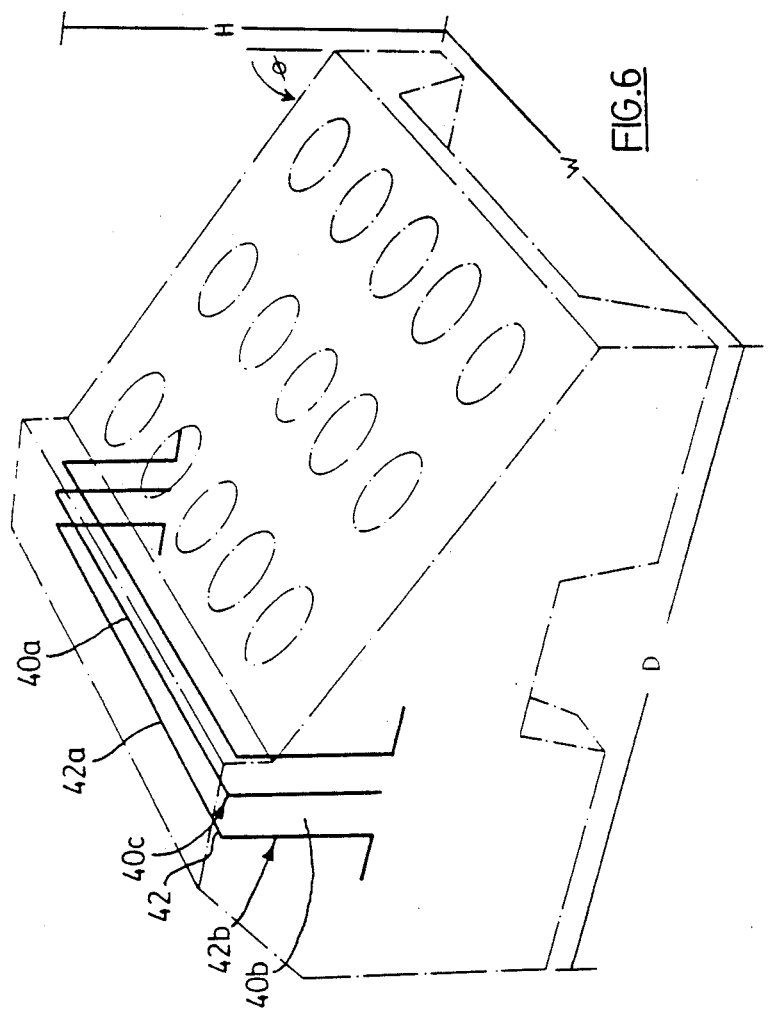
FIG. 6 is an upward perspective view of a portion of the device illustrated in FIG. 1.

In order to provide sufficient wave dissipation while having the ability to withstand the momentum of incoming waves, the devices 10 have a width "w" of about 4 feet, a depth of about 6.5 feet, a height of about 4 feet, a volume of about 1.6 cubic yards, and a weight of about 6300 pounds. In addition, an appropriate angle of inclination of the first surface relative to the vertical identified by that in FIG. 6, is approximately 60°. However, these values will depend on the density of the concrete material used, and on the characteristics of the beach floor at the installation site.

As is illustrated in FIG. 2, another feature of the device 10 is embodied in its triangular prism shape, in that it provides a centre of gravity identified at 10a which is offset from the centre line 10b of the device. This feature has a significant advantage in balancing pressures when installed, as will be described.

Figure 7:
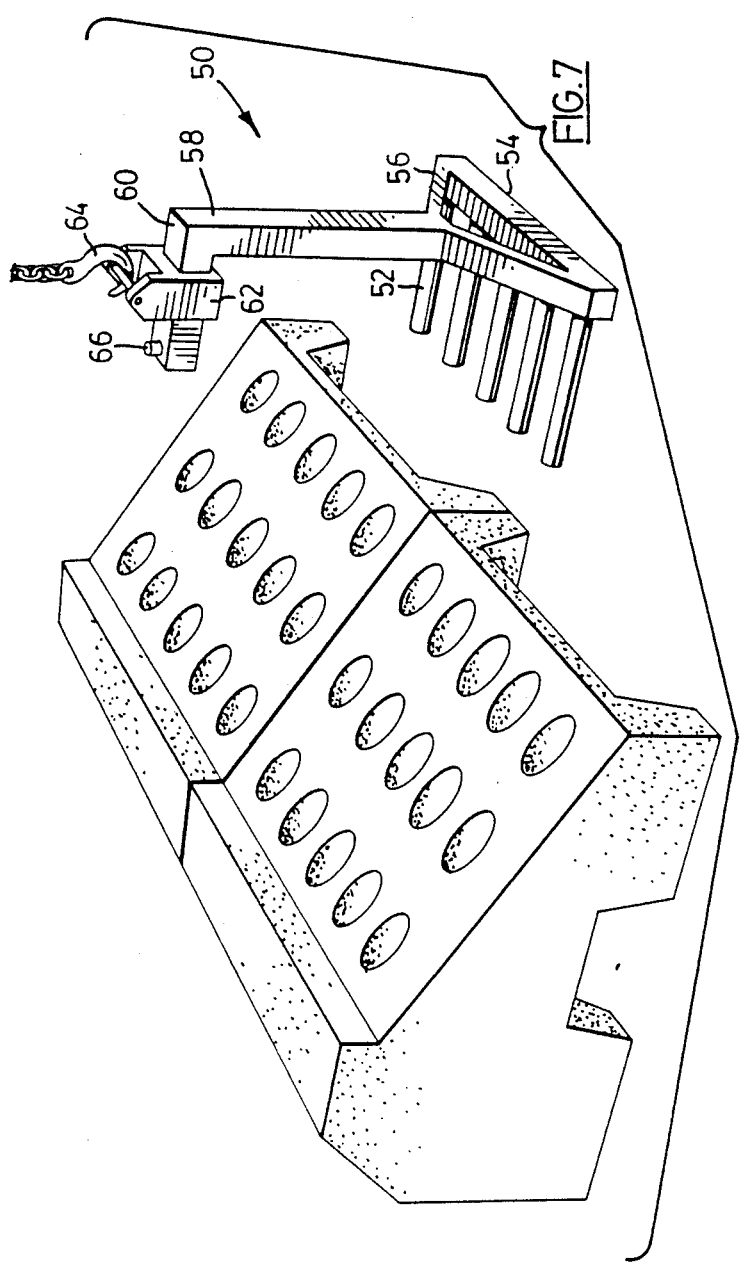
FIG. 7 is a perspective view of one application of the device illustrated in FIG. 1.

As illustrated in FIG. 7, manipulation of the erosion control device is provided by way of a lift assembly 50 having a number of cantilevered supports 52 which correspond in size and length to the upper row of passages 20. Joining the cantilevered supports is a cross-member 54, the ends of which are coupled to a pair of upwardly extending angular braces 56 which terminate at a vertical support 58. A horizontal support arm 60 extends from the upper end of the vertical support 58 and has slidably mounted thereon a coupler 62 which is engagable with a hook 64. The support arm 60 is further provided with a stop 66 at its remote end to limit the sliding movement of the coupler 62 between the vertical support 58 and the stop 66. This sliding movement enables the connection point of the lifting assembly to be adjusted according to the center of gravity of the load. Alternatively, the position of the hook may be varied to orient the cantilevered supports 52 according to the orientation of the respective passages, thereby facilitating engagement of the lifting assembly 50 therewith.

Thus, the lifting assembly 50 allows for maneuvering of the breakwater device 10, while the reinforcements 40 maintain the integrity of the device 10 during such maneuvering.

In use, a number of breakwater devices 10 are placed in spaced side by side relation on the beach floor 70 with lifting assembly 50, as is illustrated in FIG. 8, with the first and second faces 12, 16 oriented on the seaward and landward sides of the device 10 respectively.

As is typically the case, the beach floor is inclined upwardly toward the shore. Upon placement of the device 10, the weight of each is directed through the centre of gravity along a vector directed toward the centre line. This allows the weight to be distributed evenly amongst the four legs 34 so that generally equivalent pressures are seen at the contact surfaces 34a. This is advantageous when a long term stable footing is desired as the unequal pressures at the legs of the device 10 may in some cases lead to undesirable tilting thereof.

When an incoming wave contacts the device 10, the wave initially encounters the first inclined surface 22 which, by virtue of its angular orientation relative to the wave, causes a downward force to be exerted on the device 10 to enhance its footing on the beach floor.

The device 10 dissipates the kinetic energy of the incoming wave in a number of ways, the first being provided by the passages 20. As the wave contacts the first inclined surface, a portion of the wave travels through the passages 20, causing a frictional boundary layer to be established at the peripheral walls of the passages 20. As a result, a portion of the energy in the wave is absorbed by the passages by way of friction forces established therein.

Wave energy dissipation is also provided by the upper vertical portion 24 which reflects a portion of the wave back on itself, thereby cancelling a portion of the incoming wave. In addition, the devices are arranged in spaced apart relation, thereby enabling a portion of the wave to pass therebetween. This causes a frictional boundary to be established at the side walls, thereby dissipating a portion of the incoming wave energy.

A particular feature of the device 10 is embodied in the passages 36, 38 which substantially reduce the pressure variations around base 14 which would otherwise be generated by incoming and outgoing subcurrents. The reduction of these pressure variations is particularly important in ensuring that turbulent flow is not established in the subcurrents, which would cause a high rate of scour at the base 14. Furthermore, the legs 34a, 34b have a wedge configuration which provides a progressively increasing resistance to settling thereof into the beach floor. As a result, a long term solid footing is ensured.

Moreover, the passages 38 accommodate littoral subcurrents extending along the shoreline, which are common in lakes and rivers and are particularly important in maintaining the even deposition of sediment along the shoreline.

As the wave deflects over, through and around the device 10, the mean speed of the waves is substantially reduced thereby causing entrained soil and sand to be deposited on the landward side of the device 10.

Again, as water returns to the device, passages 36, 38 reduce high pressure zones in the water around the device, thereby substantially reducing, if not eliminating, scouring occurring at the base of the device 10.

Having described a preferred embodiment, it is to be understood that several variations are contemplated. As an alternative to passages 36, 38, the base 14 may be omitted by placing the body portion 12 of a number of breakwater devices on a shelf support which extends along the shoreline and is upwardly spaced from the beach floor. As well, the location of the centre of gravity may be adjusted upon construction of the device 10 by altering its shape slightly. In this manner the device 10 may be tailored to the inclination of the beach at the installation site. The device may also be made from other suitable materials including steel while bearing in mind that an appropriate measure must be taken to protect the material against the effects of weather.

Thus, the device 10 is not only effective in dissipating waves but also has a base which minimizes scouring. Moreover, the location of the centre of gravity allows even pressures to be exerted on the legs when the device is located on an inclined beach surface. The legs also provides a footing for the device which is stable on a smooth beach floor as well as an uneven beach floor which is marked by boulders, crevices, or the like.

I claim:

1. A modular breakwater device for placement on a beach floor of a body of water and near a shore thereof for alleviation of the effects of erosion, comprising:
   a body portion having a first surface defining a seaward face and oppositely disposed therefrom a second surface defining a landward face;
   a plurality of first passages extending between said first and second surfaces for the passage of water therethrough, said body having a continuous uninterrupted lower surface and a number of legs extending from said lower surface to space said lower surface from said beach floor to define a second passage, each of said legs having a pair of opposed upwardly diverging side surfaces whereby said legs provide a stable footing for said device by minimizing the effects of scour along said legs and, said diverging surfaces provide a progressively increasingly resistance to settling of said device into said beach floor.

2. A modular breakwater device as defined in claim 1 wherein a portion of said first surface is downwardly divergent relative to a portion of said second surface.

3. A modular breakwater device as defined in claim 2 wherein said second surface includes a first generally vertical portion and a second inclined portion, upwardly extending therefrom and upwardly convergent with said first surface.

4. A modular breakwater device as defined in claim 1 wherein said first surface includes a lower inclined portion and a generally vertical portion upwardly extending from said inclined portion.

5. A modular breakwater device as defined in claim 1 wherein each of said first passages is separate and has a continuous peripheral surface.

6. A modular breakwater device as defined in claim 1 wherein said first and second surfaces terminate at an apex portion.

7. A modular breakwater device as defined in claim 6 wherein said body is provided with reinforcement bars so as to enhance the structural integrity thereof, said reinforcement bars being formed by a spanning element having a pair of end sections depending therefrom, said spanning element being disposed in said apex portion.

8. A modular breakwater device as defined in claim 1 wherein said body is provided with reinforcement members so as to enhance the structural integrity thereof.

9. A method of forming a breakwater along the shore of a body of water, comprising the steps of:
disposing a breakwater device on a beach floor, the breakwater device having a body portion with a first inclined surface defining a seaward face and oppositely disposed therefrom a second surface defining a landward face, with passages extending between said first and second surfaces, said breakwater device having a continuous uninterrupted lower surface; and
providing below said lower surface a number of legs which are spaced along the periphery thereof, each of said legs having a pair of opposed upwardly diverging side surfaces to space said lower surface from said beach floor to allow water subcurrents to flow beneath said lower surface and to provide a progressively increasing resistance to settling of said device into said beach floor.

10. A modular breakwater device for placement on a beach floor of a body of water and near a shore thereof for the alleviation of the effects of erosion, comprising:
a body having a first surface defining a seaward face and oppositely disposed therefrom a second surface defining a landward face;
a plurality of first passages extending between said first and second surfaces for the displacement of water therethrough, said body having a lower surface and having barrier means to inhibit the displacement of water between said first passages and said lower surface; and
a number of legs extending from said lower surface and spaced along a peripheral region thereof to space said lower surface from said beach floor to define a second passage, each of said legs having a pair of opposed upwardly diverging side surfaces whereby said legs provide a stable footing for said device by minimizing the effects of scour along said legs and said diverging side surfaces provide a progressively increasing resistance to settling of said device into said beach floor.

11. A modular breakwater device for placement on a beach floor of a body of water and near a shore thereof for the alleviation of the effects of erosion, comprising:
a body having a first surface defining a seaward face and oppositely disposed therefrom a second surface defining a landward face;
a plurality of first passages extending between said first and second surfaces for the passage of water therethrough, said body having a continuous uninterrupted rectangular shaped lower surface and a number of legs extending from said lower surface at respective corners thereof and each having a bottom surface to space said lower surface from said beach floor and thereby to define a second passage so as to provide stable footing for said device by minimizing the effects of scour along said legs and subsequently settling into said beach floor, said lower surface having a central longitudinal axis and a midpoint, said body being shaped to provide a centre of gravity which is disposed between said landward face and said midpoint to reduce pressure variations between said bottom surfaces when said device is placed on an inclined beach floor, said landward and seaward faces being substantially perpendicular to said longitudinal axis and said second passage having a transverse dimension greater than three times the maximum width of one of said legs.

* * * * *